(12) United States Patent
Kodialam et al.

(10) Patent No.: US 7,298,704 B2
(45) Date of Patent: Nov. 20, 2007

(54) DYNAMIC PATH ROUTING WITH SERVICE LEVEL GUARANTEES IN OPTICAL NETWORKS

(75) Inventors: Muralidharan S. Kodialam, Marlboro, NJ (US); Tirunell V. Lakshman, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1232 days.

(21) Appl. No.: 09/899,509

(22) Filed: Jul. 5, 2001

(65) Prior Publication Data

US 2002/0018264 A1 Feb. 14, 2002

Related U.S. Application Data

(60) Provisional application No. 60/216,430, filed on Jul. 6, 2000.

(51) Int. Cl.
*G01R 31/08* (2006.01)
(52) U.S. Cl. .................. 370/238; 370/400; 398/49; 398/57
(58) Field of Classification Search ............. 370/351, 370/400, 401, 238, 238.1; 398/47–51, 75
See application file for complete search history.

(56) References Cited

U.S. PATENT DOCUMENTS 5,786,916 A * 7/1998 Okayama et al. ............ 398/48
6,160,651 A * 12/2000 Chang et al. ................. 398/79
6,646,989 B1 * 11/2003 Khotimsky et al. ......... 370/238
6,661,797 B1 * 12/2003 Goel et al. ............. 370/395.21
6,738,354 B1 * 5/2004 Ashwood Smith .......... 370/248
6,898,205 B1 * 5/2005 Chaskar et al. ............. 370/450
6,925,257 B2 * 8/2005 Yoo ............................ 398/47

* cited by examiner

*Primary Examiner*—Chau Nguyen
*Assistant Examiner*—Jung Park

(57) ABSTRACT

A scheme for guaranteeing network tunnel path (NTP). e.g., Internet Protocol (IP), service levels in optical (e.g., wavelength-division multiplex (WDM)) networks. The invention, in one embodiment, accounts for both network topology (e.g. switches, cross-connects, and links between nodes) and resource usage (e.g., available/provisioned link bandwidth and available/used wavelength paths), which information may be available from the IP and optical WDM protocol layers, in particular (i) router capacities and (ii) presence or absence of wavelength conversion capability of optical cross-connect at each node. A determination is made whether to route an arriving request for an NTP over existing topology by computing "good" routes in accordance with a defined metric, or to open a new, available optical wavelength path by provisioning nodes of the topology for, and computing "good" routes for new wavelength paths. As many requests as possible are identified without a priori information of future requests.

30 Claims, 4 Drawing Sheets

DYNAMIC PATH ROUTING WITH SERVICE LEVEL GUARANTEES IN OPTICAL NETWORKS

CROSS-REFERENCE TO RELATED APPLICATIONS

This application claims the benefit of the filing date of U.S. provisional application no. 60/2 16,430, filed on Jul. 6, 2000

BACKGROUND OF THE INVENTION

1. Field of the Invention

The present invention relates to path routing of packets with service level guarantees in an optical telecommunication network.

2. Description of the Related Art

Packet networks establish new paths through a given network topology, sometimes termed network tunnel paths (NTPs). New paths are established by implementing a routing algorithm when a packet connection request for the path arrives at the network (an NTP request). The NTP request generally specifies a source, which is the node or router of the network that receives the packets for the connection from an external entity (also termed the "origination" or "ingress" node/router). The NTP request also specifies at least one destination, which is the node or router of the network that ultimately receives the packets for the connection from the source (also termed the "termination" or "egress" node/router). For networks that allow provisioning of guaranteed service levels, sometime called quality of service (QoS) guarantees, the request may also include a requested minimum service level. Service levels commonly provisioned are guaranteed bandwidth for the connection, minimum delay, minimum dropped packets, or guaranteed buffer size. As known in the art, most, if not all, of these service levels may be converted into a quantity called "effective bandwidth" for the routing algorithm.

NTP requests in packet networks following the Internet protocol (IP) may have traffic carried over wavelength division multiplex (WDM) optical networks. Routing of NTP requests occurs through a routing method or algorithm accounting only for packet (i.e., the IP layer) information only. Wavelength routing at the optical devices of the network takes only optical network information (i.e., the optical layer) into account. The typical approach to routing a path of an NTP request is to separate the routing at each protocol or network layer. For example, a routing algorithm may be implemented at the IP layer to route individual requests independently of network provisioning of wavelengths at the optical layer in the WDM optical network to meet overall increases in demand. Wavelength routing of the optical layer sets up a quasi-static logical topology that is then used at the IP layer by the IP routing algorithm.

Many algorithms for routing bandwidth guaranteed paths considering only the IP layer topology and resource information exist in the art, such as widest-shortest path routing, minimum-interference routing, and shortest-path routing with load-dependent weighting. Many algorithms exist in the art for wavelength routing at the optical layer. A key difference between IP layer routing algorithms and wavelength routing algorithms is the characterization of node capabilities. In IP layer routing, the algorithms assume that the node has no switching limitations between links arriving at or leaving the node, and account for link topology and the available/used link capacity when routing a new path through the nodes of the network. However, for wavelength routing, optical network node elements may have different types of wavelength conversion (e.g., optical switching or crossconnect) capabilities, and, thus, these algorithms account for these limitations in wavelength conversion by each node.

SUMMARY OF THE INVENTION

In accordance with embodiments of the present invention, a network employs integrated, dynamic routing (IDR) of service level (e.g., bandwidth) guaranteed paths for network tunnel paths (NTPs), such as Internet Protocol (IP) packet connections, through an optical network, such as a wavelength division multiplex (WDM) optical network. For example, IDR accounts for both optical network topology (e.g., optical switches and crossconnects as well as the links between nodes) and resource usage information (e.g., the available/provisioned link bandwidth and available/used wavelength paths). IDR determines several aspects of routing for an arriving request for a network tunnel path (e.g., a request to set up a new packet connection). First, IDR determines whether to route an arriving request for a network tunnel path over the existing topology or to open one or more new optical wavelength paths. Second, if IDR determines to route the request over the existing topology, "good" routes in accordance with a defined metric are computed. Third, if new wavelength paths are opened, IDR identifies which nodes (e.g., optical switches or routers) of the topology are to provisioned for the new wavelength path and computes "good" routes for these new wavelength paths. IDR accommodates as many requests as possible without a priori information of future requests. IDR accounts for i) router capacities, and ii) presence or absence of wavelength conversion capability of optical crossconnect at each node.

In accordance with exemplary embodiments of the present invention, a path is between an ingress node and an egress node in a packet network for a new demand. A graph is generated for the packet network integrating logical and optical layers as nodes and links of the graph, wherein each node of the graph accounts for presence or absence of wavelength conversion within the node. The graph is modified, if necessary, based on the new demand and any previously routed demands; and a route is determined through the modified graph for the new demand as the path.

BRIEF DESCRIPTION OF THE DRAWINGS

Other aspects, features, and advantages of the present invention will become more fully apparent from the following detailed description, the appended claims, and the accompanying drawings in which:

FIG. 8 shows the graph of FIG. 7 that IDR employs to model the combined state of the IP and optical layers after a demand is routed; and.

DETAILED DESCRIPTION

Embodiments of the present invention employ an integrated, dynamic routing (IDR) method for routing of bandwidth guaranteed network tunnel path (NTP) in optical networks. In accordance with embodiments of the present invention, IDR accounts for the combined knowledge of resource and topology information in both the packet and optical network layers. IDR employs modeling of network elements at both the IP and optical layer to generate a reduced network graph. Based on the demand of a request for the path, the reduced network graph is modified to account for interference to routing of the demand to future requests. A shortest path routing algorithm is then used to compute the path within the modified and reduced graph.

The exemplary embodiments herein describe IDR for routing IP layer label switched path (LSP) requests in multi-protocol label switched (MPLS) packet networks that are carried over wavelength division multiplex (WDM) optical networks. However, as would be apparent to one skilled in the art, the present invention is not so limited and may be employed for a variety of different packet networks with packet layer switching protocols carried through an optical network. IDR as described herein accounts for bandwidth, or effective bandwidth, as a service level guarantee of the NTP request when establishing a path, but the present invention is not so limited and may be extended to other forms of service level. IDR employs link residual capacities, defined as available bandwidth (or effective bandwidth) at the IP layer, and available wavelengths and wavelength conversion capabilities at the optical layer.

Figure 1:
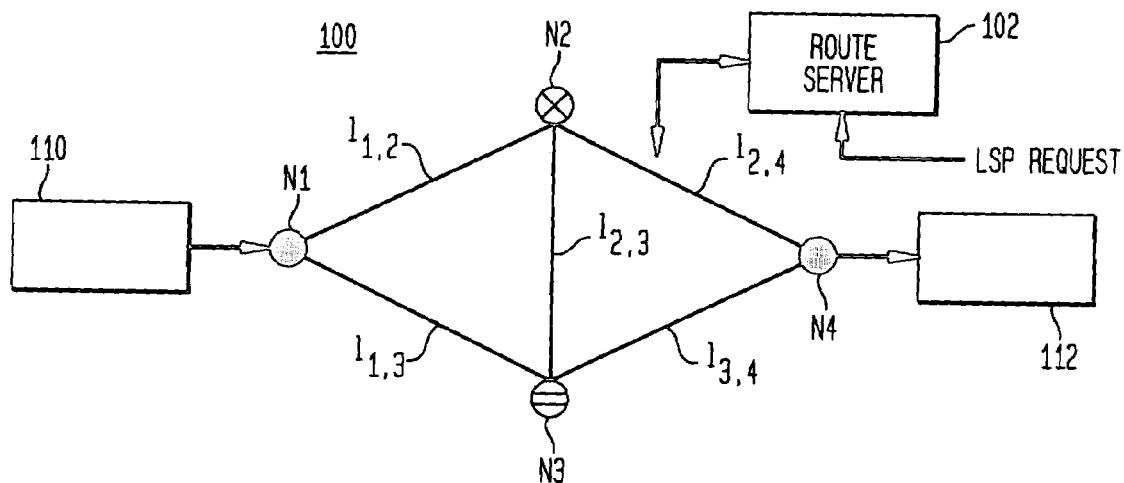
FIG. 1 shows a wavelength division multiplex (WDM) optical network employing embodiments of integrated dynamic routing (IDR) in accordance with the present invention.

FIG. 1 shows a WDM optical network 100 having a set N of nodes N1, N2, N3, and N4 interconnected by a set $L_N$, of optical links $l_{1,2}$, $l_{1,3}$, $l_{2,3}$, $l_{2,4}$, and $l_{3,4}$. (i.e., $l_{i,j} \in L_N$, $1 \leq ij \leq 4$.) Each of the nodes in N includes a router for directing packets of link into the node to one or more links out of the node. The router of a node is an optical network element having WDM input and output interfaces. Nodes N1 and N4 are at the edges of network 100 (termed edge nodes) that include those routers that connect network 100 to external networks. The edge nodes include those routers defined as ingress-egress routers. Ingress-egress routers are those routers that are specified as a possible source o or destination t of an LSP request that arrives at an edge node.

Thus, WDM optical network 100 may be an optical network with each link corresponding to an optical fiber carrying multiple wavelengths, and where each network element is either an optical cross-connect (OXC) or a backbone router with a WDM interface. A (e.g., backbone) router may switch packets with any granularity and perform wavelength conversion (i.e., route packets from any incoming interface to any outgoing interface regardless of the particular incoming or outgoing wavelength). An OXC switches any wavelength from any input fiber link to any outgoing fiber link, and is a wavelength switch that operates with wavelength granularity. Thus, an OXC may only switch 1) packets of all connections of a link carried at a given wavelength at an input interface to 2) a link of an output interface at either the same wavelength (no wavelength conversion) or at a different wavelength (wavelength conversion). For example, an OXC implemented with an electrical cross-connect may perform wavelength conversion, while an all-optical OXC, such as those based on MEMS technology, may not perform wavelength conversion.

WDM optical network 100 employs one or more signaling and messaging techniques to communicate system and network level information between nodes. For example, WDM optical network 100 may use a link-state discovery method similar to those known in the art (such as OSPF and MPLS signaling for RSVP or LDP), and may use signaling and messaging packets within the network to dynamically set-up wavelength paths between nodes. This link-state discovery method and signaling enables WDM optical network 100 to use a single control-plane for MPLS and optical channel routing, while also extending MPLS signaling/messaging to the optical layer network.

WDM optical network 100 may also use a standard signaling or messaging method (again, such as OSPF and MPLS signaling) to permit each of the routers to exchange network topology and provisioning information. Standard signaling and messaging can thus dynamically request wavelength paths from the optical network. These signaling and messaging techniques between the packet and optical layers enable integrated online routing of bandwidth guaranteed paths where an arriving bandwidth request may either be i) routed over the existing logical (IP-level) topology (due to previously set-up wavelength paths) or ii) routed by setting up new wavelength paths.

WDM optical network 100 employs IDR in accordance with the described embodiments of the present invention. IDR may be implemented by either each node or, as shown in FIG. 1, by route server 102 coupled to nodes within WDM optical network 100. IDR may be implemented with an algorithm incorporating link weighting and shortest path computation, and the algorithm for IDR is termed herein as the maximum open capacity-routing algorithm (MOCA). MOCA determines routing for an LSP request based on 1) certain design objectives and 2) network modeling for the network in accordance with the present invention as described subsequently.

Figure 2:
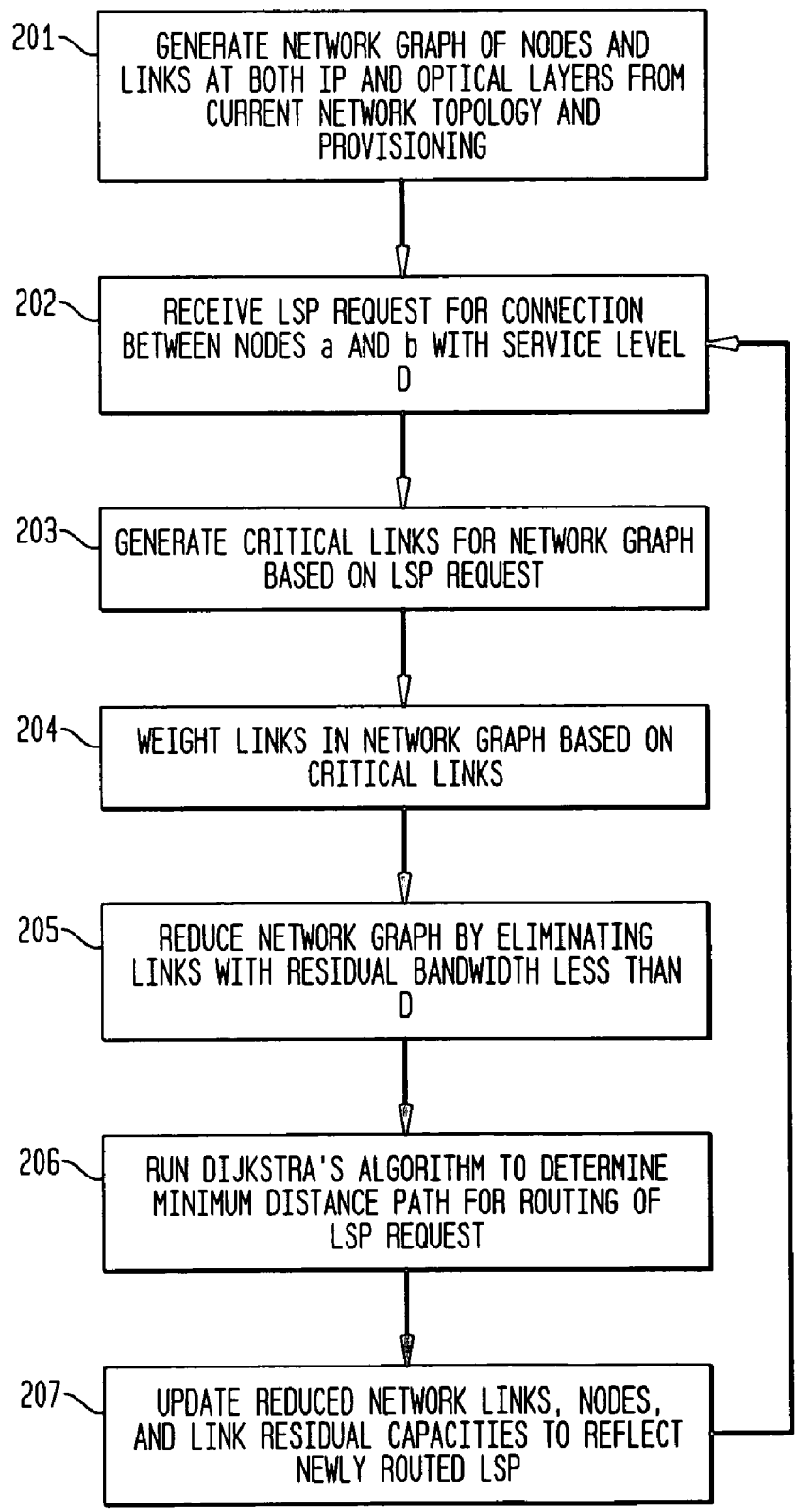
FIG. 2 shows an exemplary algorithm of an embodiment of IDR for the WDM optical network of FIG. 1.

FIG. 2 shows an exemplary method of implementing of MOCA. At step 201, a graph G $(N, L_G)$ of the cut-through arcs and the residual capacities of all the links is formed from the existing network topology and links (which may be represented by a graph G $(N, L_N)$). A node in the existing topology may include i) a router or ii) an OXS either with or without wavelength conversion. Step 201 forms a new network graph substituting nodes and adding/eliminating links based on whether the node is a router or an OXS either with or without wavelength conversion.

At step 202, an LSP request is received (e.g., at route server 102) that specifies an ingress node a and an egress node b to establish a connection with a flow of D units of bandwidth (or other service level converted to effective bandwidth).

At step 203, the critical links for the network graph given the LSP request are determined. At step 204, each link in the network graph is weighted based on the corresponding number of critical links for the link.

At step 205, all links which have residual bandwidth less than D are eliminated from the network graph to form a reduced network graph.

At step 206, Dijkstra's algorithm is employed to compute the minimum distance path in the reduced network graph for the LSP request.

At step 207, MOCA updates the reduced network graph to reflect the newly routed LSP request along the path generated at step 206, which update includes updating the residual capacities of the cut-through arcs and router-to-router arcs along the newly routed path.

After step 207, MOCA returns to step 202 for the next LSP request.

MOCA design objectives and techniques to generate the network model for WDM optical network 100 of step 201, are now described.

The following design objectives may be employed to generate a particular implementation for IDR. First, MOCA is desirably an on-line algorithm. With this objective, after the routing an LSP request it is possible that no further available capacity between certain ingress-egress routers may exist, even though a different routing may have resulted in some available capacity between those routers. Re-routing of existing LSPs is unlikely except upon link failures, (or relatively rare network re-optimization), and routing demands of future LSP requests is possible. Thus, the algorithm is desirably an on-line algorithm capable of routing requests in an "optimal" manner when the requests are not all presented at once and re-routing of existing LSPs is not allowed.

Second, MOCA may have knowledge of pairs of ingress-egress routers within the network. Even though demands of future LSP requests may be completely unknown, the routers where LSPs may originate and terminate are known to MOCA since these are the network's edge routers. Thus, the algorithm may use available knowledge of pairs of ingress-egress routers, and does not necessarily consider every node (network element or optical device) as an ingress or egress router.

Third, the algorithm accommodates as many LSP requests as possible without any a priori knowledge of future LSP requests.

Fourth, the algorithm uses re-routing performance upon link failure as a performance metric. When a link fails, a link restoration algorithm desirably finds as many alternate routes for as many LSPs as possible. If, before failure, certain ingress-egress router pairs have no residual capacity available between them, then re-routing LSPs between these pairs after link failure is not necessarily possible. An objective of the algorithm is to maximize (as mathematically defined) a surrogate measure of the residual capacity between all ingress-egress pairs to allow the algorithm to perform relatively well upon link failure.

Fifth, the algorithm routes without traffic splitting, and so routes a desired amount of bandwidth between a given ingress-egress pair without splitting the packets of the connection into multiple paths in an arbitrary way at every potential router in the path.

Sixth, any heuristic or approximation algorithm that is implemented on a router or route server desirably executes within a reasonable time-budget for a given packet network having a practical number (e.g., a few thousand) ingress-egress pairs. As known in the art, such algorithm is thus NP-hard with respect to routing at the IP layer.

Seventh, the algorithm may be implemented in a distributed manner throughout a given network. Thus, each LSP determined route is computed at the local ingress router without communication with a domain or area wide route-server in communication with all routers of the nodes in the network. Hence, it is desirable for the algorithm to use information derived in current routing protocols or their extensions, such as use of topology information and residual capacities on links. In employing OSPF and its extensions, the topology information may be derived from the link state database, with residual capacities derived using messaging and signaling methods as described above.

Eighth, when routing over multiple areas or multiple domains, the algorithm desirably generates information that may be employed by the network for aggregation of bandwidth availability between ingress-egress pairs.

Ninth, routing of existing LSPs may be optimized through re-routing of the LSPs with the algorithm. Though frequent re-routing is generally not performed, occasional re-routing of existing LSPs may be employed so that the network may carry more traffic. This optimization is possible since on-line route selection happens with more available information as each successive LSP request is established.

Tenth, the algorithm satisfies network policy constraints, such as policy restrictions on the type of links or routers that are permissible for routing a given LSP, and accommodates requirements such as preemption and set-up priorities.

With these design objectives, the algorithm is then based on a model of, for example, WDM optical network 100 that employs the following methods of modeling links, optical and router devices, and link capacities. WDM optical network 100 is modeled as network with a set N of nodes interconnected by m optical links, $\{l_1, l_2, \ldots, l_m\}$, with m a positive integer and the m optical links are of the set $L_N$. Each optical link supports k wavelengths, $\{\lambda_1, \lambda_2, \ldots, \lambda_k\}$, with k a positive integer. Each node comprises either 1) a router, 2) an OXC with wavelength conversion, or 3) an OXC without wavelength conversion.

The set R is defined as the set of nodes which are routers (e.g., nodes N1 and N4 of FIG. 1), the set S is defined as the set of nodes which are OXCs with wavelength conversion (e.g., node N2), and the set T is defined as the set of nodes which are OXCs without wavelength conversion (e.g., node N3). Therefore, a node in the set R may multiplex or demultiplex bandwidths at any granularity and also allow wavelength conversion. For ease of understanding in the present description, all routers have sufficient optical interface capacity and may process all the traffic that potentially flows through it. In practice, the algorithm may be modified to account for the case in which a router has limited processing capacity. A node in the set S may do wavelength conversion and may switch a given wavelength on an incoming link to the same or different wavelength on a given outgoing link. A node of the set T only performs optical switching of a given wavelength on an incoming link to the same wavelength on an outgoing link without wavelength conversion.

A subset of nodes in the set R are defined as ingress and/or egress nodes that are edge nodes (e.g., nodes N1 and N4) and between which LSP connections may be established dynamically. From a given ingress node, an LSP may be established with only a given set of egress nodes. This constraint may arise from policy or service provisioning constraints. Such information is known, changes relatively infrequently, and is available from a database through a provisioning or administrative mechanism. The set P is the set of "distinguished" router pairs defined as the set of all potential ingress-egress router pairs. The set P is a subset or equivalent to ($\subseteq$) R×R. All LSP requests (also termed demands) occur between these pairs in the set P.

The $i^{th}$ LSP request to establish connection $LSP_i$ is defined by the triple $(o_i, t_i, b_i)$. The first field, $o_i \in R$, specifies the ingress router, the second field, $t_i \in R$, specifies the egress router, and the third field, $b_1$, specifies the amount of bandwidth (service level) required for $LSP_1$. For the following described embodiment, a unit for the bandwidth request, $b_1$, may be defined as the transmission rate for one wavelength, though one skilled in the art would realize that all quantities may be scaled. Therefore, typical bandwidth requests as described herein may be fractional values. In addition, service level guarantees, such as quality of service (QoS) are translated into an effective bandwidth value. LSP requests arrive one at a time and there is no knowledge of the characteristics of future demands.

Each LSP request arrives at, for example, the router or route server, which determines the explicit-route for the LSP. If a route server is used, the request either arrives directly to the route server (if the LSPs are being set-up manually) or may first arrive at ingress routers which then query the route server via a messaging or signaling protocol to generate the explicit route. The explicit route is then communicated back to the ingress router. The ingress router then uses a signaling mechanism such as RSVP or LDP to set-up the path to the egress and to reserve bandwidth on each link on the path. With MPLS integration into the optical layer the same protocols may be used to establish wavelength paths at the optical layer as needed. For calculating the explicit route, the route server knows the current network topology and the available capacities of links at both the IP and optical layers. Failure of an LSP due to a link failure is detected from a signaling protocol (e.g., LDP or RSVP) information by the edge routers. Re-routing of the LSPs after the link-state database has been updated may occur by routing protocols or by other means.

The functional model for developing IDR is now described for 1) routers and OXCs with and without wavelength conversion at the IP layer, and 2) routers and OXCs with and without wavelength conversion at the optical layer. Returning to FIG. 1, nodes N1-N4 are connected by optical links in set $L_N$. Each of links carries data on wavelengths $\lambda_1$ and $\lambda_2$. Nodes N1 and N4 are routers (shown as a solid dot), node N2 is an OXC with wavelength conversion (shown as a circle with an "X" inside), and node N3 is an OXC without wavelength conversion (shown as a circle with parallel lines inside). An LSP request arrives with triple {o=N1, t=N4, b=0.1} which is a request to set up an IP packet connection from node 1 to node 4 with a demand (e.g., service guarantee) of 0.1 units along the path. If, for example, this LSP request is routed from node N1 to node N3 to node N4 using wavelength $\lambda_1$, node N3 may no longer use wavelength $\lambda_1$ to route traffic of other nodes along the path N2 to N3 to N4. Node N3 may no longer use wavelength $\lambda_1$ to route traffic because node 3 is an OXC that switches only between the same wavelengths. Node N3, therefore, may no longer multiplex traffic of future LSP requests coming from node N2 in incoming link $l_{2,3}$ onto the unused capacity of wavelength $\lambda_1$ in outgoing link $l_{3,4}$. Therefore, once traffic is routed on a particular wavelength from a node in $r_1 \in R$ through a set $S \cup T$ (the union of sets S and T) of nodes to another node in $r_2 \in R$, then this particular wavelength acts is a direct connection between $r_1$ and $r_2$. This direct connection may be defined as a logical link in the IP layer.

The mathematical difference between 1) modeling routers and OXCs with wavelength conversion and 2) OXCs without wavelength conversion is now described. A packet flow may be established in the network between nodes $a \in R$ and $b \in R$. This packet flow may comprise packets of existing LSP request demands that have been routed, or potential demands that may be routed from node a to node b. Let $y_{i,j}^k$ represent the amount of flow on link $l_{i,j}$ between nodes i, and j over wavelength $\lambda_k$. Since all flows go between nodes a and b at each node in the path through the network, with the exception of nodes a and b themselves, the amount of flow into each node should equal the amount of flow out of the node. If node $p \in R \cup S$ then the balance of flow may be expressed as given in equation (1):

$$\sum_k \sum_l y_{lp}^k - \sum_k \sum_l y_{pl}^k = 0 \quad \forall p \in R \cup S. \qquad (1)$$

If, for example, node p is an OXC without wavelength conversion, then flow may not go from one wavelength to another at this node p. Therefore, the flow balance of equation (1) for this case also holds for each wavelength of the node. In this case, the balance of flow may be expressed as given in equation (2):

$$\sum_l y_{lp}^k - \sum_l y_{pl}^k = 0 \quad \forall k \forall p \in T. \qquad (2)$$

In contrast, routers and OXCs with wavelength conversion may switch flows of incoming links between different outgoing links at different wavelengths. Thus, from the perspective of representing the flows at the optical layer, the routers and OXCs with wavelength conversion may be modeled equivalently. Given the relationship of flows, the various routines that calculate, for example, maximum flow, critical links, shortest path through a graph use the flow expression of equation (1) for routers and OXCs with wavelength conversion, and will use the flow expression of equation (2) for OXCs without wavelength conversion.

Figure 3:
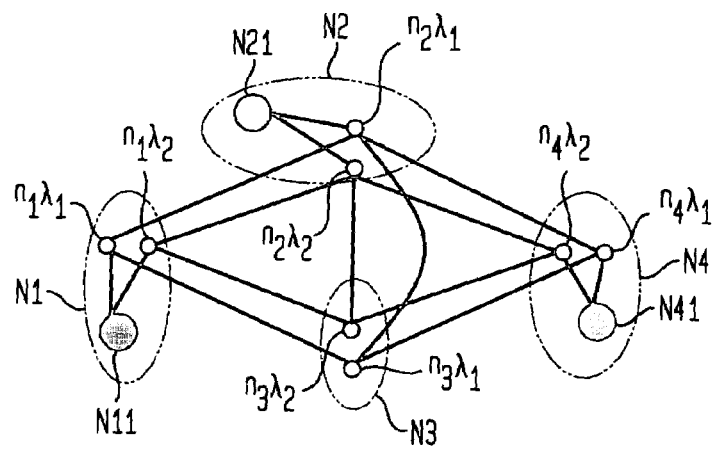
FIG. 3 shows an alternative representation for the WDM optical network shown in FIG. 1 that may be employed as a network graph by the algorithm of FIG. 2.

FIG. 3 shows an alternative representation for the WDM optical network 100 shown in FIG. 1. In accordance with IDR of the present invention, the representation of FIG. 3 may be employed to generate the routing algorithm to compute routes taking into account the capabilities of the different types of network elements. Each node of FIG. 1 is expanded into one or more sub-nodes, one sub-node per wavelength ($n_1\lambda_1$, $n_1\lambda_2$, $n_2\lambda_1$, $n_2\lambda_2$, $n_3\lambda_2$, $n_4\lambda_1$, and $n_4\lambda_2$). For the 2-wavelength example of WDM optical network 100 of FIG. 1, node N3 (the node without wavelength conversion) is represented by two sub-nodes, and nodes N1, N2, and N4 (the nodes capable of wavelength conversion) are represented by two sub-nodes and a super-node. For OXCs without wavelength conversion, each sub-node is connected to a wavelength on each incoming or outgoing link as shown in FIG. 2. For OXCs with wavelength conversion and for routers, the node also includes a super-node (N11, N21, and N41) coupled to the sub-nodes by infinite capacity links. Wavelength conversion occurs by traversing through this super-node from one sub-node at one wavelength to another sub-node at a different wavelength (e.g., from $n_2\lambda_1$ to $n_2\lambda_2$ through super-node N21).

Figure 4:
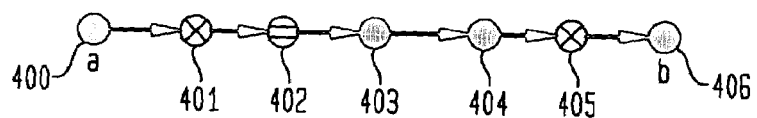
FIG. 4 shows an example of a path through routers and optical cross-connects (OXCs) both with and without wavelength conversion.

Modeling logical links in an IP network is now described. An LSP request arrives with a demand of $r_d$ ($r_d \leq 1$ units) is to be routed from node $a \in R$ to node $b \in R$. If the LSP request is the first demand in the network and the path for this demand is determined, this path, in general, will pass through a sequence of routers and OXCs (with or without wavelength conversion). FIG. 4 shows an example of one such path through routers and OXCs (both with and without wavelength conversion). When a particular wavelength of each link between nodes of the path carries $r_d$ units of the demand, a residual capacity $c_r$, of $(1-r_d)$ units of bandwidth is available in that wavelength for future demands. The OXCs (with or without wavelength conversion) generally do not perform sub-wavelength granularity bandwidth switching or multiplexing. Therefore, if the path passes through some OXCs between routers, the residual bandwidth of $(1-r_d)$ units of bandwidth may be modeled by introducing a cut-through arc between the routers and eliminating the wavelength links in the original graph. The terms "arc" and "link" are generally equivalent terms in the art. This cut-through arc represents a logical link in the IP layer. All the non cut-through arcs are also the links in the physical (optical) layer. If the path has two routers that are adjacent then the residual capacity of the wavelength that is used to route this demand is reduced by $r_d$ units.

Figure 5:
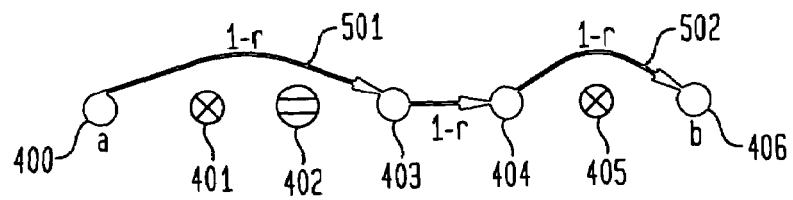
FIG. 5 illustrates the path of FIG. 4 with links replaced by cut-through arcs representing logical IP links after routing a first demand.

FIG. 5 illustrates the path of FIG. 4 replacing appropriate links with cut-through arcs representing logical IP links after routing this first LSP. Cut through arcs representing logical IP links are represented by curved lines 501 and 502. IDR in accordance with embodiments of the present invention routes all future demands using the new network model having cut-through arcs as in FIG. 5. If, after routing a future demand, the residual capacity of a logical link in the network reaches one unit (normalized quantity) on any LSP departure (i.e., the logical IP link is no longer used by any LSP), then new network model is modified as follows. The logical IP link with one unit is eliminated and the original physical (optical) links in the network that constituted the logical IP link are re-established with unit capacity. This is equivalent to removing the cut-through wavelength path from the model.

Next, the effect of network location of each ingress and egress router for the model is described. Each ingress and egress router for the current LSP request may also serve as an ingress and/or egress router for traffic of LSP requests established in the future. If routing of a current LSP request does not account for the location of these ingress and egress routers with respect to future traffic, then routing of the current LSP request may "interfere" with the routing of some future demands. Such interference is illustrated with respect to the network shown in FIG. 6.

Figure 6:
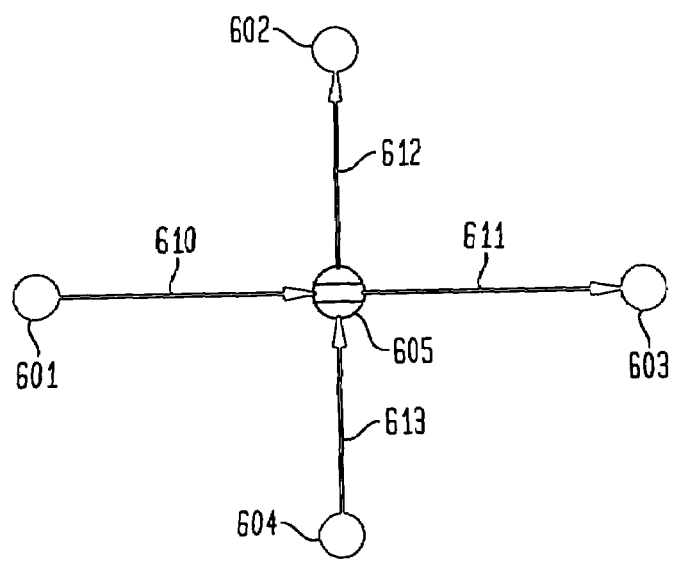
FIG. 6 shows a network in which min-hop routing may cause interference to routing of future demands.
Figure 7:
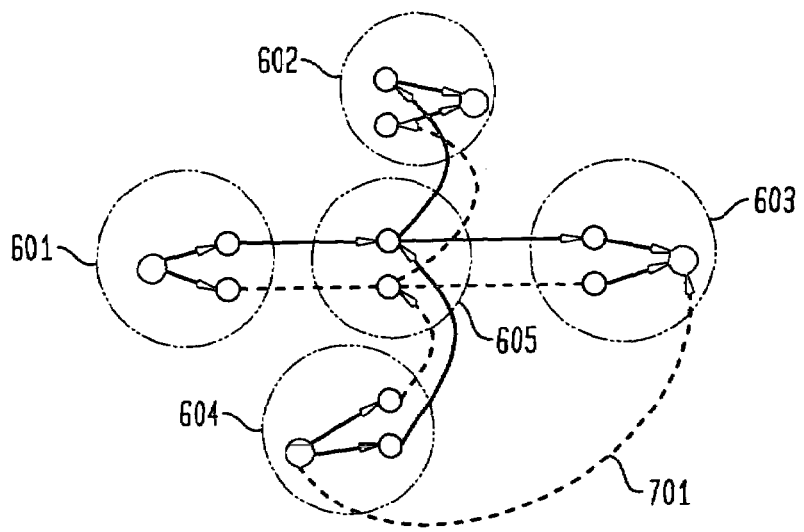
FIG. 7 is a graph of the network shown in FIG. 6 generated by employing the modeling techniques at the IP and optical layers.

Referring to FIG. 6, nodes 601-604 (shown as dark nodes) represent nodes with routers and node 605 (shown as a light node) represents a node without a router. Each of links 610-613 carries two wavelengths, $\lambda_1$ and $\lambda_2$. Employing the modeling techniques at the IP and optical layers described above, the network of FIG. 6 may be modeled as shown in FIG. 7. FIGS. 6 and 7 show three potential ingress egress pairs, (601, 602), (601, 603), (604, 603), (604, 602). The route server (not shown in FIGS. 6 and 7) receives an LSP request for with demand b=0.2 to establish a connection between the ingress egress pair (604, 603). The route server determines that this demand is routed along the wavelength $\lambda_1$ (represented by the dotted line 701 in FIG. 7). After routing this demand, 0.8 units of residual bandwidth remain on the cut-through arc 701 between nodes 604 and 603.

Figure 8:
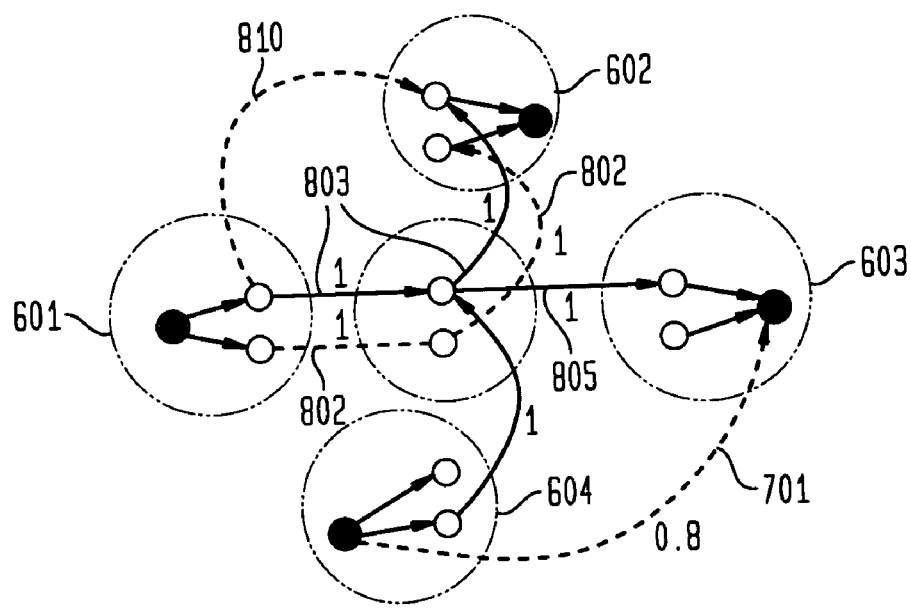

FIG. 8 shows the graph of FIG. 7 that IDR employs to model the combined state of the IP and optical layers after the demand of 0.2 wavelengths is routed. FIG. 8 shows deletion of some wavelength capacity from the optical layer after routing this demand that leaves 0.8 units of residual bandwidth on the cut-through arc 701. A subsequent LSP request arrives having demand b=0.3 units to establish a connection between nodes 601 and node 602. A route server has two options for paths to route this demand: a first path is the wavelength corresponding to the dotted line 802, and the second path is the wavelength corresponding to the solid line 803. If min-hop routing is used to find the path through the minimum number of nodes, then these two paths appear equivalent since the same number of nodes (i.e., one node, node 605) is traversed in both paths. However, if wavelength $\lambda_2$ (solid line 803) is used to route this demand, then nodes 601 and 603 are "disconnected" from the other nodes of the graph. Nodes 601 and 603 are "disconnected" from the other nodes of the graph since link 805 would be deleted from the graph. If wavelength $\lambda_1$ (dotted line 802) is used to route this demand, nodes 601 and 603 remain connected to other nodes of the graph through link 805. Therefore, implementations of IDR in accordance with the present invention route LSP requests along paths that minimize (in a mathematical sense and in accordance with a predefined criterion) the "interference" to the network for routing of future LSP requests, while maximizing (also in a mathematical sense and according to a predefined criterion) the residual or open capacity between the ingress-egress pairs.

To minimize interference and maximize open capacity, paths are selected that do not interfere "too much" with potential future requests for routing of demands between other ingress egress pairs. Thus, paths are selected such that the open capacity is maximized after routing by modifying the model to account for open capacity between edge nodes of the network. After some demands have been routed, an estimate of the available open capacity between the different ingress-egress pairs may be generated.

The estimate of open capacity is computed as the maximum flow (maxflow) that may be sent from a given ingress node to a given egress node over the network, where the capacity of a link is its current residual capacity. Techniques for computing the maxflow value for a given network graph with provisioned capacity are well known in the art. For example, a discussion of maximum flow calculation is given in Ahuja, Magnanti, and Orlin, *Network Flows: Theory, Algorithms, and Applications*, Prentice-Hall, 1993, Chapter 7. The maxflow value is computed based on the network as a graph with logical IP links and optical links modeled as previously described. The maxflow value provides an upper bound on the amount of demand that may be routed between an ingress-egress pair if a given demand is not split across multiple paths. The maxflow value also provides an estimate of the available capacity between different ingress-egress pairs. If the maxflow value between a given ingress-egress pair is zero, then no additional demand may be routed between that ingress-egress pair.

The maxflow value depends on the residual capacity of the links in the network. For a particular ingress-egress pair, from linear programming duality, the maximum flow also corresponds to the minimum cut (mincut) path. If the capacity of any of the links in the mincut is decreased, the maximum flow value between that ingress-egress pair decreases. Consequently, the number of demands that may be routed between this ingress-egress pair in the future also decreases. Therefore, all the links that belong in the minimum cut for an ingress-egress pair are defined as critical to that ingress-egress pair. Since there may be more than one mincut for an ingress-egress pair, all arcs belonging to any mincut are defined to be critical for that ingress-egress pair, and these links are termed "critical links". Computation of critical links for unicast and multicast flows is described in U.S. patent application Ser. No. 09/677,009, filed on Sep. 29, 2000, entitled MULTICAST ROUTING WITH SERVICE-LEVEL GUARANTEES BETWEEN INGRESS-EGRESS POINTS IN A PACKET NETWORK, whose teachings are incorporated herein by reference.

Figure 9:
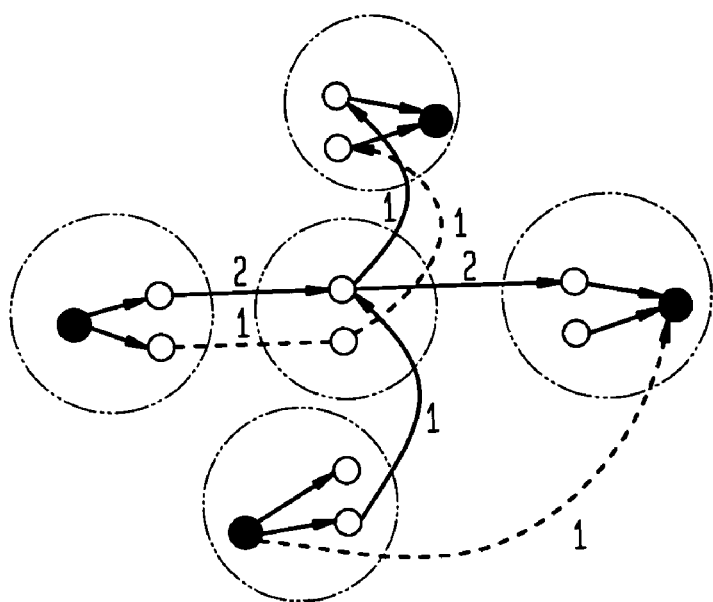
FIG. 9 shows the graph of FIG. 8 after weighting links in accordance with critical links of the network.

With critical links known for a network graph, such as the network graph shown in FIG. 8, the links may be "weighted"

in accordance with the number of ingress-egress pairs for which that arc (link) is critical. Once the critical links are determined, a path for an LSP request that maximizes open capacity is the path that maximizes the sum of the maxflows between all other ingress-egress pairs. FIG. 9 shows that graph for the illustrative example given in FIG. 6, with the number next each are being its weight (number of ingress-egress pairs for which that arc is critical). For the graph of FIG. 9, the shortest path for the route from node 1 to node 2 uses $\lambda_1$ instead of $\lambda_2$ due to the weighting of links based on maxflow values and critical link computation.

Thus, as shown in FIG. 2, once the critical links are identified for a given i) network topology model, ii) residual capacity of the links, and iii) newly arrived request with demand, IDR generates a weighted graph where the critical links have weights that are an increasing function of their "criticality". The increasing weight function is selected so as to defer loading of the critical links whenever possible. Then actual route for the LSP request is calculated using a shortest path computation, such as by using the well-known Dijkstra's algorithm, for the weighted graph formed with both the logical IP and optical link modeling techniques described above.

Given the techniques for modeling a network at the IP and optical layers and generating critical links, the MOCA algorithm described with respect to FIG. 2 adds a demand for a newly arrived LSP request. When a demand leaves the system (i.e., an LSP tear-down request), the MOCA algorithm is reversed and residual capacities increased. When a logical IP link's residual capacity is one unit, then the logical link is removed and the optical links that make up the logical link are introduced back into the network with unit residual capacity.

The following pseudo-code may be used to implement MOCA.

100 INPUT:
101 Either:
  NETWORK=G(N, $L_N$) (For first RUN with network topology information with provisioned links and wavelengths $L_N$ and the residual capacities, if any, for these links.
102 OR:
  NETWORK=G(N,$L_G$) (For subsequent runs utilizing current network G(N,$L_G$) with $L_G$ including the cut-through arcs and the residual capacities of all links.)
103 $LSP_i$={o=a, t=b, d=D} (receive $LSP_i$ request to route a connection between an ingress node a and an egress node b between for a flow of D units.
104 BEGIN:
105 IF NETWORK==G"(N,$L_G$)
106 Call MODEL routine (input NETWORK=G(N,$L_N$), output is G(N,$L_G$) and is a routine that generates model for NETWORK=G(N,$L_N$) of routers, OXSs with wavelength conversion, and OXSs without wavelength conversion as nodes and arcs of graph G(N,L) using cut-through arcs and residual capacities of all the links).
107 NETWORK=G(N,$L_G$).
108 ENDIF
109 CALL Routine CRITICAL LINKS (input is G(N,$L_G$) and $LSP_i$ and output is set CR of critical links, routine for a given input NETWORK G(N,L) that computes the critical links for (s,d)∈ P\(a,b).
109 FOR ALL $l_i$∈ $L_G$ in G(N,$L_G$)
  $Wl_i$=num($l_i$∈CR) (Each weight $Wl_i$ of all the arcs (links) $l_i$∈ $L_G$ including the cut-through arcs is calculated as the number of critical links including the linl $l_i$).
110 IF $c_{rl}$<D
111 THEN: $L_G$=$L_G$−$l_i$ (Eliminate all links which have residual bandwidth less
112 than D and form a reduced network G'(N,$L_G$).
113 ENDIF
114 CALL Routine DYKSTRA (the routine implements Dijkstra's algorithm to compute the minimum path $P_{LSP}$ for $LSP_i$ in the reduced network given input is G'(N,$L_G$) and $LSP_i$ and output are nodes $N_{LSP}$ and links $L_{LSP}$ of $P_{LSP}$).
115 CALL Routine UPDATE_NETWORK (the routine receives reduced network G'(N,$L_G$) and forms a new, updated network G"(N,$L_G$) having cut-through and router-to-router arcs with the updated residual capacities along the routed path).
116 NETWORK=G(N,$L_G$)←G"(N,$L_G$)
116 OUTPUT: $P_{LSP}$ (provides the path of nodes and links between a and b having a capacity of D units of bandwidth).

IDR may allow service provider to rapidly deploy bandwidth guaranteed service by dynamically establishing service level guaranteed paths between an optical network's ingress-egress routers. IDR may be more robust to changing traffic patterns at the IP layer, than a routing algorithm at the IP layer only that uses a static wavelength topology determined a priori with an assumed network traffic distribution.

While the exemplary embodiments of the present invention have been described with respect to system blocks implementing certain algorithms, as would be apparent to one skilled in the art, various functions of the blocks may be implemented in the digital domain as processing steps in a software program, in hardware by circuit elements, or in combination of both software and hardware. Such software may be employed in, for example, a digital signal processor, micro-controller or general-purpose computer. Such hardware and software may be embodied within circuits implemented in an integrated circuit.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of routing, along a path between an ingress node and an egress node in a packet network, packetized data corresponding to a new demand, the method comprising the steps of:

(a) generating a graph for the packet network integrating logical and optical layers as nodes and links of the graph, wherein each node of the graph accounts for presence or absence of wavelength conversion within the node;

(b) modifying the graph, if necessary, based on the new demand and any previously routed demands;

(c) determining a route through the modified graph as the path for the new demand; wherein:

for step (a), each wavelength of an optical link between a pair of nodes is modeled with a corresponding wavelength link in the graph, and step (b) further comprises the step of replacing a series of wavelength links corresponding to a portion of a provisioned path between a pair of nodes with a cut-through arc; and (d) providing the determined route to one or more nodes in the packet network to enable the routing of the packetized data along the determined route.

2. The invention as recited in claim 1, wherein, for step (a), each router and OXC with wavelength conversion is modeled with at least two sub-nodes and a super-node, wherein each sub-node of a node corresponds to an available wavelength and is coupled to each other sub-node of the node through a super-node.

3. The invention as recited in claim 2, wherein for each coupled pair of nodes in the graph, each sub-node having the same wavelength of the coupled pair is coupled with a corresponding link.

4. The invention as recited in claim 2, wherein the flow of packets into a node balances the flow of packets out of a node.

5. The invention as recited in claim 1, wherein, for step (a), each OXC without wavelength conversion is modeled with at least two sub-nodes, wherein each sub-node corresponds to an available wavelength at the corresponding node in the graph.

6. The invention as recited in claim 1, wherein, for step (a), each node and link of the graph is present in the graph based on a residual capacity of each wavelength of each optical link.

7. The invention as recited in claim 1, wherein step (a) models i) each node based on whether it is a router, an optical cross-connect (OXC) with wavelength conversion, or an OXC without wavelength conversion, and ii) each available wavelength of an optical link between nodes in the graph with a corresponding link in the graph.

8. The invention as recited in claim 1, wherein step (c) includes the step of computing the path through the modified graph via a shortest path routing algorithm.

9. The invention as recited in claim 1, wherein, for step (a), at least one of the nodes includes an optical interface, and at least one of the links is an optical link, and the nodes and links are in a wavelength division multiplex communications network.

10. The invention as recited in claim 1, wherein step (b) modifies the graph by the steps of:

(b1) eliminating links based on the demand, (b2) calculating critical links for the graph based on the demand and a residual capacity of each link in the graph, (b3) weighting links based on the critical links.

11. The invention as recited in claim 10, wherein, for step (b2), the critical links are calculated based on a step of estimating an open capacity between pairs of possible ingress and egress nodes in the packet network.

12. A method of routing, along a path between an ingress node and an egress node in a packet network, packetized data corresponding to a new demand, the method comprising the steps of:

(a) generating a graph for the packet network integrating logical and optical layers as nodes and links of the graph, wherein each node of the graph accounts for presence or absence of wavelength conversion within the node;

(b) modifying the graph, if necessary, based on the new demand and any previously routed demands, by the steps of:

(b1) eliminating links based on the demand, (b2) calculating critical links for the graph based on the demand and a residual capacity of each link in the graph, and (b3) weighting links based on the critical links;

(c) determining a route through the modified graph as the path for the new demand; and (d) providing the determined route to one or more nodes in the packet network to enable the routing of the packetized data along the determined route.

13. The invention as recited in claim 12, wherein, for step (b2), the critical links are calculated based on a step of estimating an open capacity between pairs of possible ingress and egress nodes in the packet network.

14. The invention as recited in claim 12, wherein, for step (a), each node and link of the graph is present in the graph based on a residual capacity of each wavelength of each optical link.

15. The invention as recited in claim 12, wherein step (a) models i) each node based on whether it is a router, an optical cross-connect (OXC) with wavelength conversion, or an OXC without wavelength conversion, and ii) each available wavelength of an optical link between nodes in the graph with a corresponding link in the graph.

16. The invention as recited in claim 12, wherein step (c) includes the step of computing the path through the modified graph via a shortest path routing algorithm.

17. The invention as recited in claim 12, wherein, for step (a), at least one of the nodes includes an optical interface, and at least one of the links is an optical link, and the nodes and links are in a wavelength division multiplex communications network.

18. Apparatus for routing, along a path between an ingress node and an egress node in a packet network, packetized data corresponding to a new demand, the apparatus comprising:

(a) means for generating a graph for the packet network integrating logical and optical layers as nodes and links of the graph, wherein each node of the graph accounts for presence or absence of wavelength conversion within the node;

(b) means for modifying the graph, if necessary, based on the new demand and any previously routed demands;

(c) means for determining a route through the modified graph as the path for the new demand;

wherein:

for means (a), each wavelength of an optical link between a pair of nodes is modeled with a corresponding wavelength link in the graph, and means (b) further comprises means for replacing a series of wavelength links corresponding to a portion of a provisioned path between a pair of nodes with a cut-through arc; and (d) means for providing the determined route to one or more nodes in the packet network to enable the routing of the packetized data along the determined route.

19. The invention as recited in claim 18, wherein means (b) modifies the graph by:
  (b1) eliminating links based on the demand,
  (b2) calculating critical links for the graph based on the demand and a residual capacity of each link in the graph,
  (b3) weighting links based on the critical links.

20. Apparatus for routing, along a path between an ingress node and an egress node in a packet network, packetized data corresponding to a new demand, the apparatus comprising:
  (a) means for generating a graph for the packet network integrating logical and optical layers as nodes and links of the graph, wherein each node of the graph accounts for presence or absence of wavelength conversion within the node;
  (b) means for modifying the graph, if necessary, based on the new demand and any previously routed demands, by:
    (b1) eliminating links based on the demand,
    (b2) calculating critical links for the graph based on the demand and a residual capacity of each link in the graph, and
    (b3) weighting links based on the critical links;
  (c) means for determining a route through the modified graph as the path for the new demand; and
  (d) means for providing the determined route to one or more nodes in the packet network to enable the routing of the packetized data along the determined route.

21. The invention as recited in claim 5, wherein for each coupled pair of nodes in the graph, each sub-node having the same wavelength of the coupled pair is coupled with a corresponding link.

22. The invention as recited in claim 5, wherein the flow of packets into a node at a wavelength balances the flow of packets out of a node at the wavelength.

23. The invention as recited in claim 1, further comprising the step of routing packetized data along the path.

24. The invention as recited in claim 11, wherein the step of estimating the open capacity computes the maximum flow value for each of the pairs of possible ingress and egress nodes.

25. The invention as recited in claim 1, wherein the method is embodied in a processor of at least one of a route server and a router of a packet network.

26. The invention as recited in claim 13, wherein the step of estimating the open capacity computes the maximum flow value for each of the pairs of possible ingress and egress nodes.

27. The invention as recited in claim 12, further comprising the step of routing packetized data along the path.

28. A computer-readable medium having stored thereon a plurality of instructions, the plurality of instructions including instructions which, when executed by a processor, cause the processor to implement a method for routing, along a path between an ingress node and an egress node in a packet network, packetized data corresponding to a new demand, the method comprising the steps of:
  (a) generating a graph for the packet network integrating logical and optical layers as nodes and links of the graph, wherein each node of the graph accounts for presence or absence of wavelength conversion within the node;
  (b) modifying the graph, if necessary, based on the new demand and any previously routed demands;
  (c) determining a route through the modified graph as the path for the new demand;
  wherein:
    for step (a), each wavelength of an optical link between a pair of nodes is modeled with a corresponding wavelength link in the graph, and
    step (b) further comprises the step of replacing a series of wavelength links corresponding to a portion of a provisioned path between a pair of nodes with a cut-through arc; and
  (d) providing the determined route to one or more nodes in the packet network to enable the routing of the packetized data along the determined route.

29. The invention as recited in claim 28, wherein step (b) modifies the graph by the steps of:
  (b1) eliminating links based on the demand,
  (b2) calculating critical links for the graph based on the demand and a residual capacity of each link in the graph,
  (b3) weighting links based on the critical links.

30. A computer-readable medium having stored thereon a plurality of instructions, the plurality of instructions including instructions which, when executed by a processor, cause the processor to implement a method for routing, along a path between an ingress node and an egress node in a packet network, packetized data corresponding to a new demand, the method comprising the steps of:
  (a) generating a graph for the packet network integrating logical and optical layers as nodes and links of the graph, wherein each node of the graph accounts for presence or absence of wavelength conversion within the node;
  (b) modifying the graph, if necessary, based on the new demand and any previously routed demands, by the steps of:
    (b1) eliminating links based on the demand,
    (b2) calculating critical links for the graph based on the demand and a residual capacity of each link in the graph, and
    (b3) weighting links based on the critical links;
  (c) determining a route through the modified graph as the path for the new demand; and
  (d) providing the determined route to one or more nodes in the packet network to enable the routing of the packetized data along the determined route.

* * * * *